(12) United States Patent
Maimon et al.

(10) Patent No.: US 6,374,270 B1
(45) Date of Patent: *Apr. 16, 2002

(54) CORPORATE DISCLOSURE AND REPOSITORY SYSTEM UTILIZING INFERENCE SYNTHESIS AS APPLIED TO A DATABASE

(75) Inventors: Oded Maimon, Brookline; David Israel-Rosen, Dover, both of MA (US)

(73) Assignee: Japan InfoNet, Inc., Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,483

(22) Filed: Oct. 11, 1996

Related U.S. Application Data

(60) Provisional application No. 60/024,813, filed on Aug. 29, 1996.

(51) Int. Cl.⁷ .......................... G06F 7/00; G06F 17/30; G06F 17/28
(52) U.S. Cl. ............................. 707/500; 707/2; 704/2; 704/9; 706/16
(58) Field of Search ............................ 707/500, 1, 2, 707/9; 364/419; 705/36; 706/16; 704/9, 2

(56) References Cited

U.S. PATENT DOCUMENTS

| | | | | |
|---|---|---|---|---|
| 5,317,507 A | | 5/1994 | Gallant ................... | 364/419.13 |
| 5,490,061 A | * | 2/1996 | Tolin et al. .................. | 364/419 |
| 5,761,631 A | * | 6/1998 | Nasukawa ...................... | 704/9 |
| 5,799,268 A | * | 8/1998 | Boguraev ...................... | 704/9 |
| 5,857,179 A | * | 1/1999 | Vaithyanathan et al. ........ | 707/2 |
| 5,930,774 A | * | 7/1999 | Chennault ..................... | 705/36 |
| 5,970,482 A | * | 10/1999 | Pham et al. ................... | 706/16 |
| 6,263,335 B1 | * | 7/2001 | Paik et al. ...................... | 707/5 |

OTHER PUBLICATIONS

Rao, Ramana et al., System components for embedded information retrieval from multiple disparate information sources, ACM Symposium on User Interface Software and Technology, pp. 23–33, Nov. 1993.*

Hedberg, Reese S., Parallelism speeds data mining, IEEE Parallel & Distributed Technology: Systems & Applications, vol. 3, Issue 4, pp. 3–6, 1995.*

User's Guide Microsoft Access Relational Database Management System for Windows Version 2, Jun. 1994.*

Hayes, Philip J. et al., "TCS: A Shell for Content–Based Text Categorization", Mr. 5, 1990, Proc. of the Conference on Artifical Intelligence Applications, Mar. 5–9, 1990, vol. 1, pp. 320–326, IEEE.

Jacobs, Paul S. et al., "Scisor: Extracting Information from On–Line News", Communications of the Association for Computing Machinery, vol. 33, No. 11, Nov. 1, 1990, pp. 88–97.

\* cited by examiner

*Primary Examiner*—Joseph H. Feild
*Assistant Examiner*—William L. Bashore
(74) *Attorney, Agent, or Firm*—Wolf, Greenfield & Sacks, P.C.

(57) ABSTRACT

A corporate disclosure and repository system includes one or more software programs which execute on one or more general purpose data processing systems. The software programs include components for gathering information in the form of free form text documents, reducing the information to a formatted database, analyzing the contents of the database and reorganizing the database in a format suitable for drawing inferences with respect to the contents thereof and synthesizing inferences based upon the contents of the reorganized database. The software programs may be used both intracompany, in preparing documents for deposit in the repository system, and intercompany, in reviewing documents already deposited in the repository system. The intercompany part may be further divided into parts useful to regulators and parts useful to the public. The principle difference between the various parts is in certain knowledge and rules applied in the analysis and reorganization stages, since the various users of the system have different goals at those stages.

10 Claims, 8 Drawing Sheets

CORPORATE DISCLOSURE AND REPOSITORY SYSTEM UTILIZING INFERENCE SYNTHESIS AS APPLIED TO A DATABASE

This Appln claims benefit of Prov. No. 60/024,813 filed Aug. 29, 1996.

BACKGROUND

1. Field of the Invention

The present invention generally relates to software systems for gathering, storing, and retrieving data. The invention more specifically relates to such software systems wherein the data is text based. Yet more specifically, the invention relates to systems for gathering, storing and retrieving corporate disclosure information.

2. Related Art

The current practice for the gathering, storage, analysis and retrieval of data concerning corporate disclosures revolves around the Electronic Data Gathering, Analysis and Retrieval (EDGAR®) system of the U.S. Securities and Exchange Commission (SEC). EDGAR performs automated collection, validation, indexing, acceptance and forwarding of submissions made by companies and others who are required by law to file various documents with the SEC. The primary purpose of EDGAR is to increase the efficiency and fairness of the securities market for the benefit of investors, corporations and the economy as a whole by accelerating the receipt, acceptance, dissemination and analysis of time sensitive corporate information filed with the SEC.

The success of a system such as EDGAR in accomplishing the SEC's goals depends to some extent on whether all required submissions are, or even can be, filed using the system. The success also depends on the ease with which output reports may be generated and the variety and nature of the inquiries which may be made to generate reports using the system. Finally, success of the system will depend on the ease with which accurate submissions, referred to as disclosure documents, may be drafted by those companies and persons required to do so.

In order to ensure that all the data required by the SEC is collected, and further to ensure that this data is searchable, once entered into the EDGAR system, the SEC requires that EDGAR filings be done using standard forms. A list of the standard forms presently accepted for EDGAR filing is included in Appendix A. The dramatic proliferation of form types illustrated by Appendix A is a result of requiring filings to be rigidly standardized. A standard form or variant must be created for every conceivable situation.

Presently, an individual preparing a disclosure document for filing uses a general purpose word processor to create one of the form types accepted for electronic filing. The completed form is filed using an electronic mail system (E-MAIL). However, the EDGAR system provides no methods or processes for companies to uniformly perform quality control, tracking, analysis or process support while preparing a document for filing. The failure to control this part of the filing process can have serious consequences because the EDGAR system permits only the submission of disclosure documents, not the amendment or alteration of disclosure documents.

Since statute and regulation require a large number of filings from a large number of entities, the EDGAR database has grown to enormous proportions. As a result of the size of the EDGAR database, and as a consequence of inconsistencies with respect to how different entities report similar matters, it is inherently intractable to analyze the EDGAR data in a meaningful way. Basic text searches can be performed, but meaningful data reduction is substantially hampered by inconsistencies and by the variety of reporting forms used to report similar information.

SUMMARY OF THE INVENTION

The various problems of the conventional corporate disclosure and repository system discussed above and such other problems as will now be evident to those skilled in this art are overcome by the present invention in which there is provided a software system for collecting corporate disclosure information in a free text form, generating a database of disclosure information and analyzing the database of disclosure information.

A software system according to some aspects of the present invention may be fixed in a machine-readable medium. The software system may include synthesis software tools which receive documents including freely formatted text documents and which produce a formatted database of information from the freely formatted text documents; and analysis software tools which receive the formatted database and which produce an analysis output. Variations on this system are possible. For example, the synthesis tools may further include a concept dictionary relating a concept word root, a context word root and an instance word root; a parser which receives the documents and which produces a plurality of words contained in the documents; a rooter which receives the words parsed by the parser and which produces corresponding word roots for the words received; and a contexter which receives the concept dictionary and the word roots and which identifies a concept corresponding to each word root on the basis of the word roots received. Also in accordance with this variation, the word roots may include a target word root and proximate word roots identified by the parser to have originated at a location in the document proximate the target word root. In that case, the contexter may further include a context recognizer which identifies in the concept dictionary all concepts having context word roots matching proximate word roots; and an instance recognizer which identifies in the concept dictionary all concepts previously identified by the context recognizer which also include an instance word root matching the target word root. The analysis tools may further include a diagonalization tool which receives the formatted database and rearranges the formatted database to cluster similar topics together forming a grouped database in which each cluster of similar topics is a group; or a catalog defining each database entry as one of either required or optional. When a grouped database is produced, the analysis tools may further include an inferencer which receives the groups from the grouped database and which produces an inferenced database in which inferences are drawn on the basis of information present in and absent from the groups.

BRIEF DESCRIPTION OF THE DRAWINGS

In the drawings, in which like reference designations indicate like elements.

DETAILED DESCRIPTION

The present invention will be better understood upon reading the following detailed description of specific embodiments of various aspects thereof, in connection with the drawings.

Figure 1:
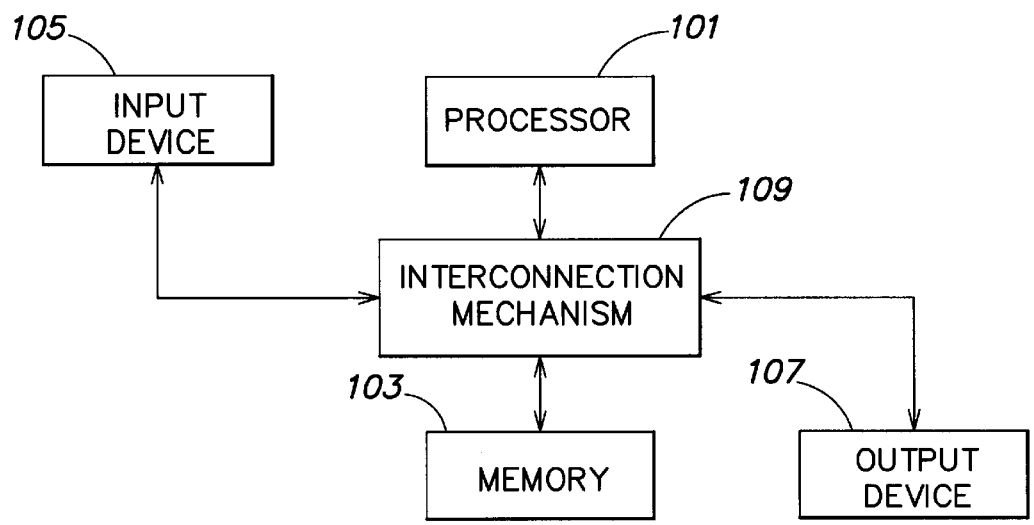
FIG. 1 is a block diagram of a data processing system suitable for operating software embodying aspects of the invention.

The system is embodied as a combination of one or more hardware elements which operate in response to instructions contained in one or more software programs. The hardware elements may include data processing elements such as shown in FIG. 1, for example.

A typical data processing system includes a processor 101, memory 103 in which data and instructions are stored, one or more input devices 105 and one or more output devices 107, all communicating through an interconnection mechanism 109. Input devices 105 may include, but are not limited to keyboards and pointing devices, such as mice. Output devices 107 include printers, modems and monitors, among others. Processor 101 may be a single-chip microprocessor, a single-board computer a digital signal processing chip or a variety of other devices known to those skilled in this art. The entire system of FIG. 1 may be realized in a personal computer (PC), a mini-computer or a mainframe computer, for example.

Figure 2:
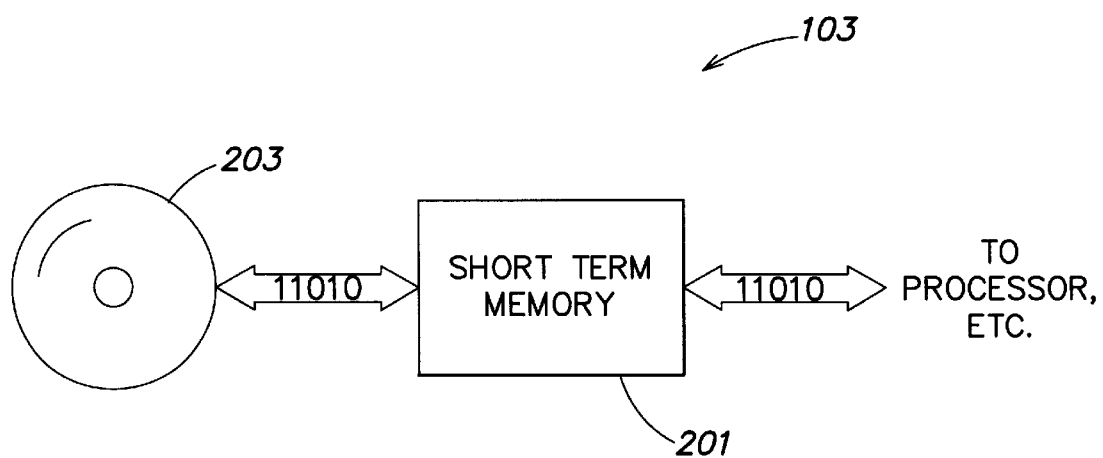
FIG. 2 is a block diagram of the memory system of the system of FIG. 1.

In any of the variations described above, memory 103 may be realized as shown in FIG. 2. Memory 103 conventionally includes a long-term storage device, such as disk 203 and a short-term storage device, such as short-term memory 201. Short-term memory 201 may be realized as dynamic random-access memory (DRAM), static RAM (SRAM), or other suitable forms which are known to those skilled in this art. Long-term memory 203 may alternatively be realized as programmable read-only memory (PROM), electrically alterable read-only memory (EAROM), electrically erasable ROM (EEROM), or other suitable forms which are also known to those skilled in this art.

In most conventional arrangements, processor 101 does not communicate data and instructions directly with disk 203, but rather data and instructions from disk 203 are stored temporarily in short-term memory 201 for quick access by processor 101.

Software programs control the operation of the hardware shown in FIGS. 1 and 2 to perform useful functions, such as those performed by systems constructed in accordance with various aspects of the present invention.

Figure 3A:
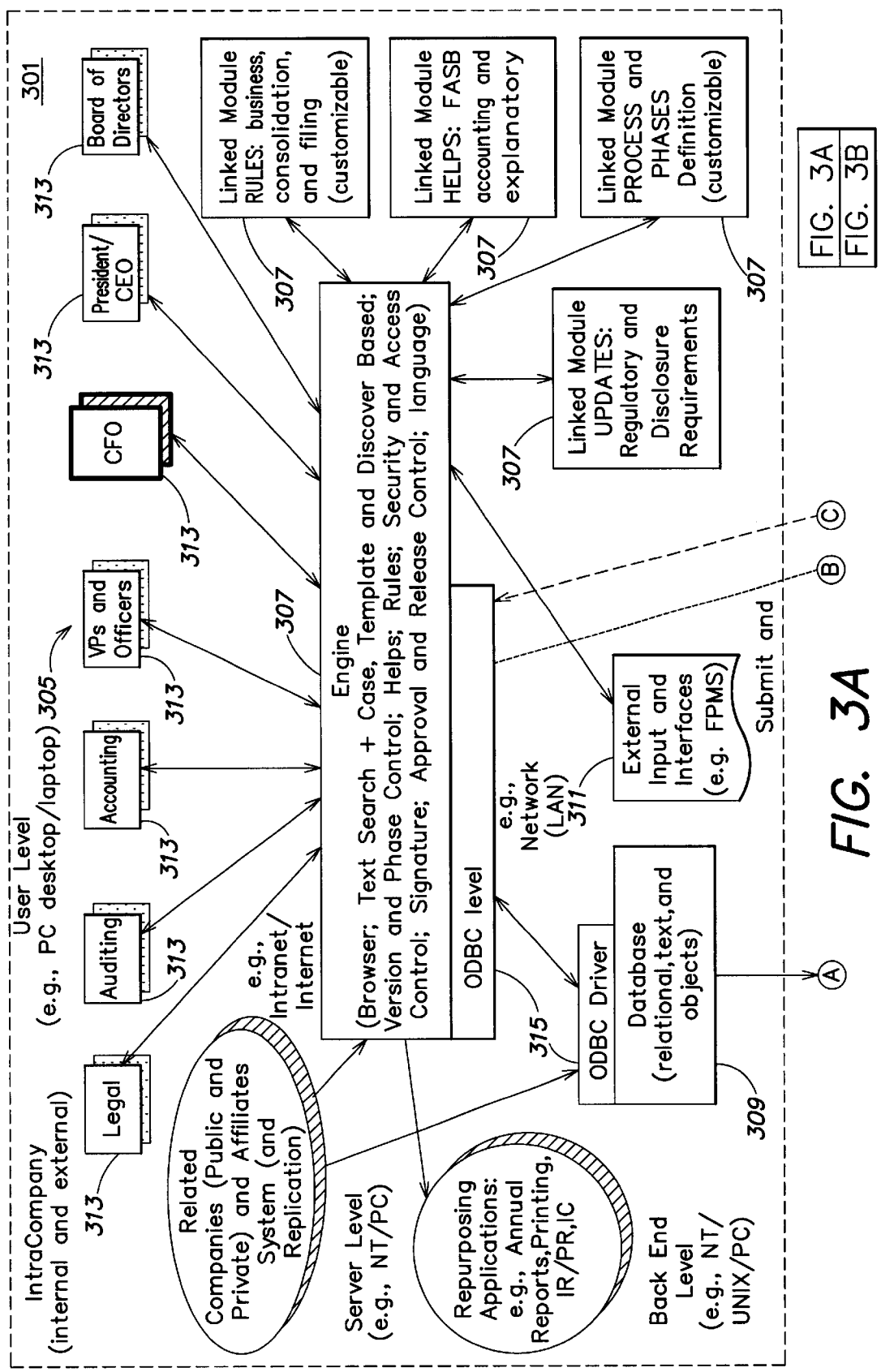
FIG. 3 is a relational block diagram of a software system according to the present invention, illustrating the transactional relationships between software modules.
Figure 3B:
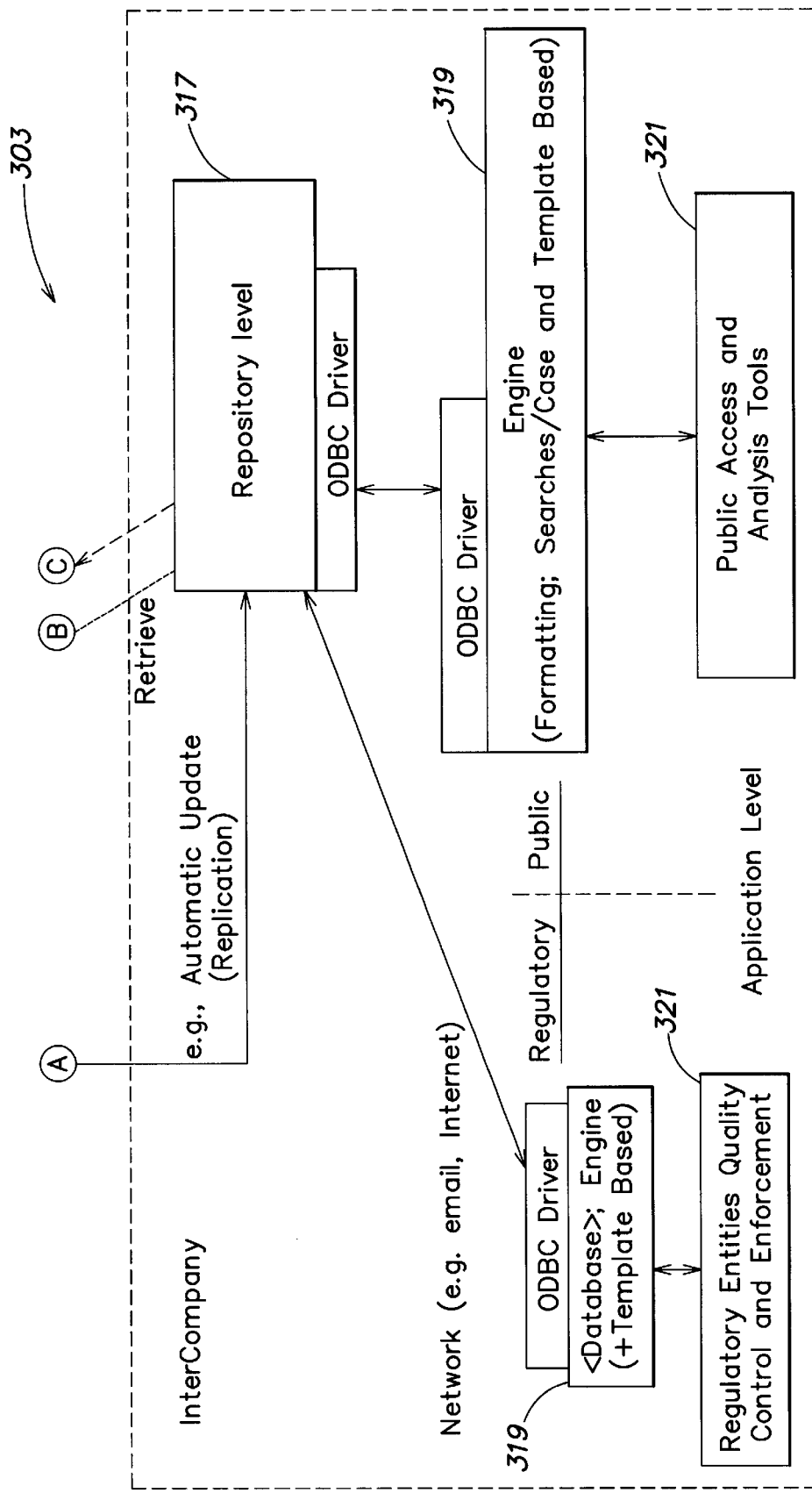

The architecture of the system, as illustrated by FIG. 3, divides the system into two major sections, the intracompany part 301 and the intercompany part 303. The intracompany part performs processes which are the responsibility of an individual reporting entity, including related companies. The intercompany part performs processes which go beyond the responsibility of an individual reporting entity. For example, the intracompany part relates to gathering information from various sources within a reporting entity and compiling from the information gathered a disclosure document, while the intercompany part relates to data reduction and analysis of disclosure documents already filed with an official government agency. Each of the described parts may include one or more software programs operating on one or more data processing systems such as shown in FIG. 1. The software programs may be written in C, C++ or any other programming language or system found to be suitable by the skilled artisan at the time of implementation. Presently preferred programming languages include C and C++.

The intracompany part includes three main levels. These are the front end, or user level 305, the middle or engine server level 307, and the back end or database level 309. External interfaces that supply information not available within the reporting entity may also be connected to the intracompany part through special front end connections 311.

The front end level 305 is the level at which reporting entity users 313 interact with the system. The front end level includes special interfaces tailored for the various information sources present within a reporting entity. For example, in SEC reporting, those information sources may include the chief financial officer, a legal department, an auditing department, accounting and various other officers and departments of a corporation.

The middle level 307 includes the operational logic of the system. The middle level also includes communication, linkage and ODBC enabling processes 315. The major features of the middle level include those listed in Table 1.

TABLE 1

| Feature | Explanation |
| --- | --- |
| Text Search | Searching by keywords and Boolean operation |
| Case Search | Searching based on related relevant similar cases (free text, plus user preference) |
| Template Based | Allows for formatting free text (for quality check, analysis and automatic inferencing) |
| Discover Based | Allows for nonformatted open ended questions that are also using data mining and inferencing techniques to dig up the answer (based on the special matrix based organization of the data). |
| Browser | It allows the user to see the data by a browser, such as HTML. |
| Version Control | Used for keeping tracks of the versions of the document |
| Phase Control | Used for keeping track and alerts according to the specified process for ready versions (e.g. draft by a certain time to be sent to specified individuals etc.) |
| Security and Access Control | Allows access to authorized people (also distinguish between and write access) |
| Signature | Allows for electronic signature |
| Approval and Release Control | Support the process of preparing the document |
| Linked Module RULES | Specific business, consolidation and filing rules (Customizable) for preparing the report |
| Linked Module HELPS | Specific legal (e.g., FASB), accounting and explanatory help |
| Linked Module PROCESS | Specific Process and Phases definition for preparing the disclosure |
| Linked Module UPDATES | Regulatory and Disclosure requirements updates |
| Reports Generator | Generating predefined and customizable reports and documents (e.g. for different types of companies) |
| Multi Language | The application supports multi language capabilities |
| Repurposing Application | Allows for application generation in addition to the disclosure documents |
| Related | For a company with affiliates and related companies that |

TABLE 1-continued

| Feature | Explanation |
| --- | --- |
| Companies | share data |
| External Input and Interfaces | Provide needed data for the documents (such as from Financial Portfolio Management Systems, and legacy systems, such as accounting). |
| ODBC | Support connectivity to any database with ODBC Driver |

The back end level includes the actual data repository of the database. The database system used herein should be appropriate for storing relations, objects including figures, maps, and digital images of documents, and free text.

The intercompany part 303 also consists of the three levels. The first level is the repository level 317. The second and third levels are an engine level 319 and an application level 321. In this part, the second and third levels may be distributed among several sub-parts. For example, there may be engine 319 and application 321 levels for use by regulatory organizations, coexistent with separate engine 319 and application 321 levels for use by the public.

The engine levels 307, 319 implement several software tools embodied in one or more software programs which are used to execute a method according to the invention. The various stages and steps next described may be performed for some purposes entirely by one engine level, or may be accomplished for other purposes by cooperation between multiple engine levels, as will be explained.

Figure 4:
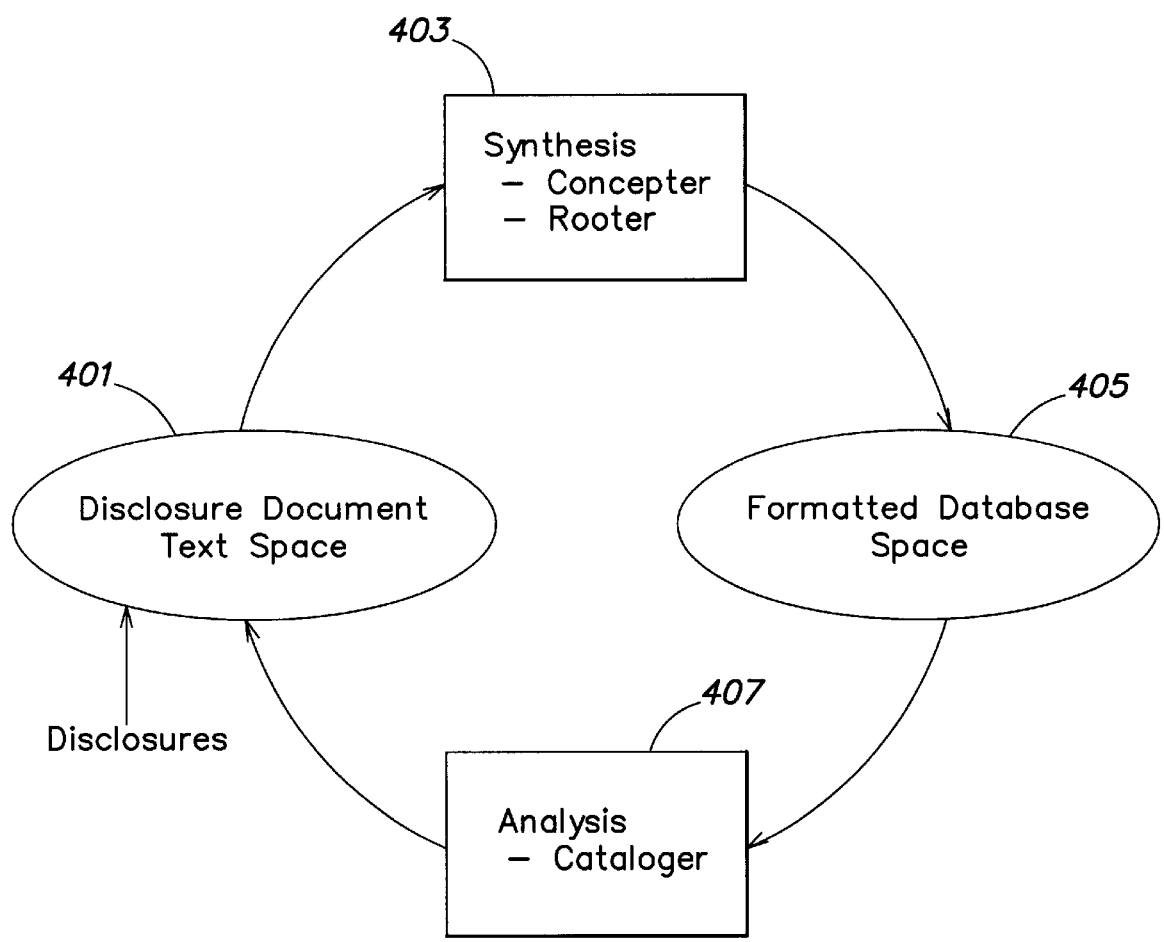
FIG. 4 is a process flow diagram of the reduction of input free format text to a usable form.

As shown in FIG. 4, a transformation of information is performed by the present invention. Documents are introduced into a disclosure document text space 401. The information contained in the text space 401 is synthesized 403 into a structured format in formatted database space 405. Finally, analysis 407 produces information in a useful textual form.

Figure 5:
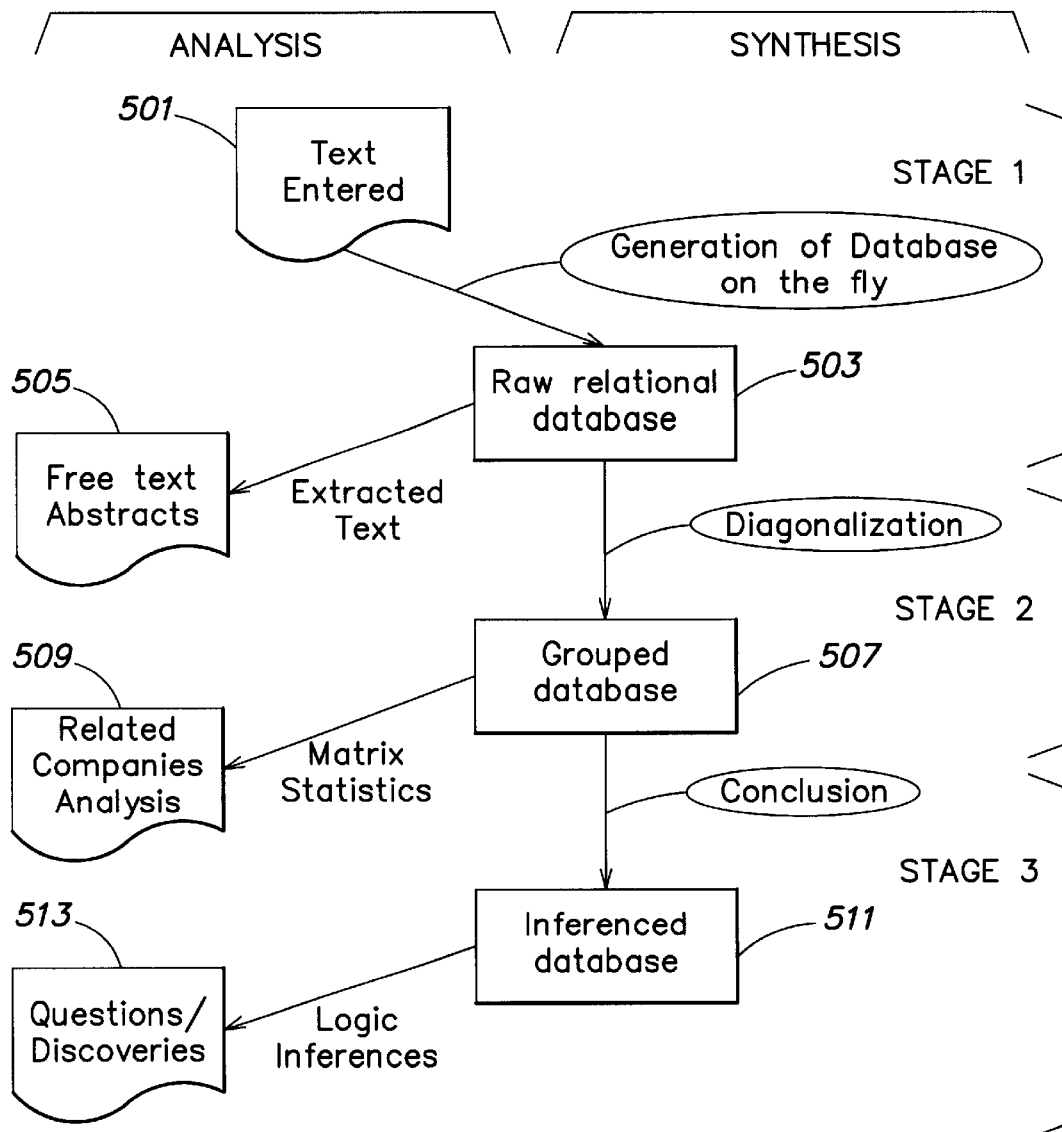
FIG. 5 is a more detailed process flow diagram of the process illustrated in FIG. 2.

FIG. 5 expands the transformation illustrated in FIG. 4 into several distinct steps. Text is entered 501 and automatically formatted as a raw relational database 503. Extracts may be taken from the raw relational database in the form of free text abstracts 505. The extractions produce abstracts which are more useful than similar extractions made directly from the text entered at step 501 because the formatting of the database brings like kinds of information together in one place. Diagonalization produces one or more grouped databases 507 which may be statistically analyzed to produce a related companies analysis 509. Finally, a conclusion process synthesizes from the grouped database 507 an inferenced database 511 which is analyzed to form a set of questions/discoveries 513.

Figure 6:
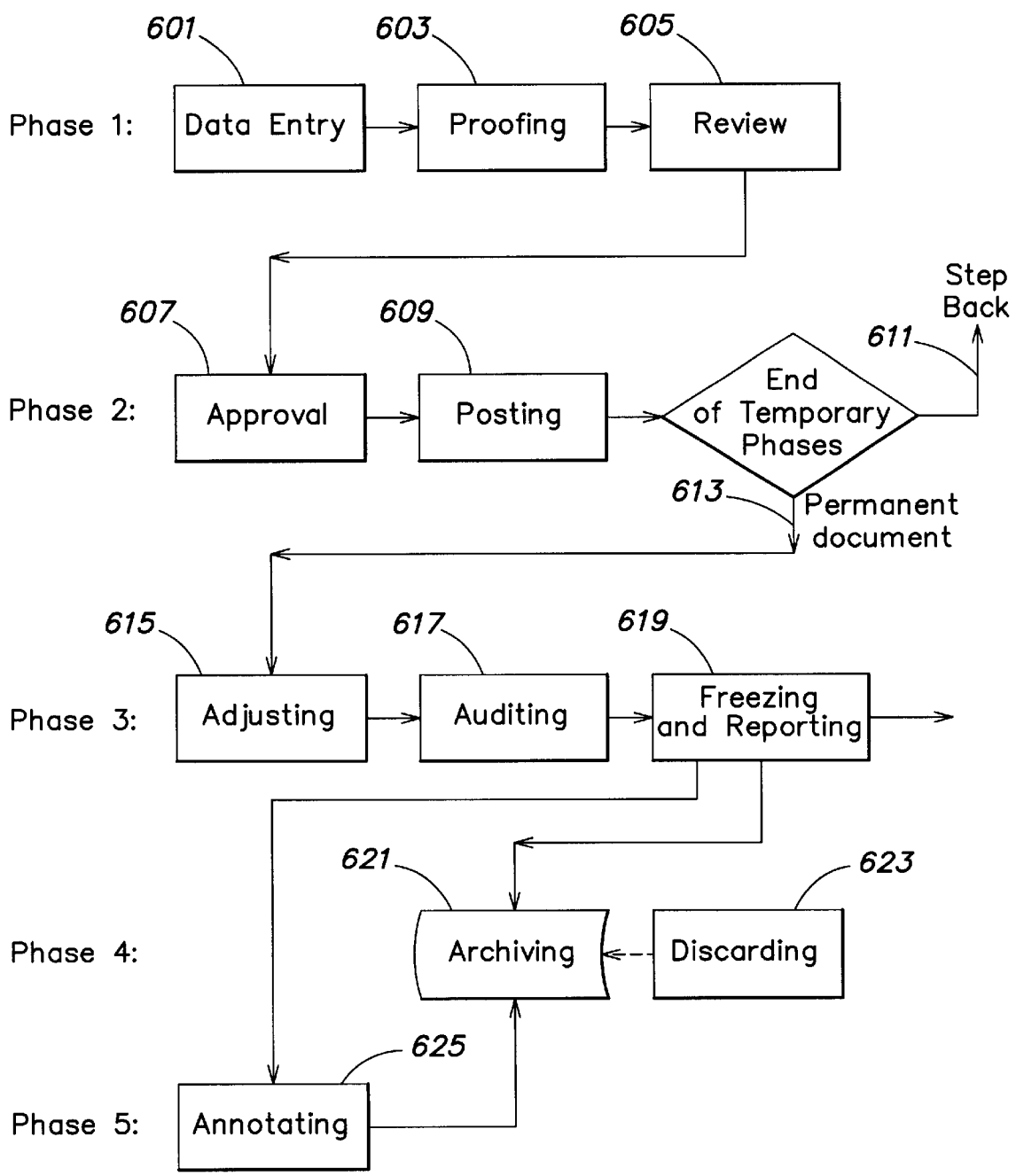
FIG. 6 is a process flow diagram of the life cycle of a corporate disclosure, as would occur by use of a system in accordance with the present invention.

The above-described transformation processes can occur at various points in the life cycle of a disclosure document. This life cycle is illustrated in FIG. 6.

During Phase 1, data is entered 601, for example using a word processor, proofread 603 and reviewed 605. When the data entry is complete, the document is reviewed 607 and posted 609 to an intracompany repository during Phase 2. If the document is not yet required to be reported externally, then the temporary phases have not ended 611 and any previous step may be revisited, resulting in modifications to the document. However, when the temporary phases end 613, a permanent document is created during Phase 3. Final adjustments are made 615, the document is audited for completeness, correctness, etc. 617 and the document is finally frozen and reported 619. No further changes are permitted after reporting 619. When the document then enters Phase 4, it is archived 621 for some useful duration, after which it may be discarded 623. Although the document reported at step 619 may not be modified in a typical reporting system, there may be a Phase 5 of the document life cycle, during which the document may be annotated 625. Thus, explanations and corrections required, for example, by a regulatory agency may be entered.

The generation of a reporting entity's database of documents to be reported to a regulatory agency and integration of the reporting entity's database with the regulatory agency's database of documents reported is now described. Free text is entered by the user at various stages in the life cycle of a reporting document. Several software tools are used to process the input.

Generating the Raw Relational Database (RRD)

First, the Expanded Conceptual Dictionary (ECD) is discussed. This dictionary relates five kinds of information, conceptually described here as five columns: the left hand side is the Concept, the middle two columns are Main Key and the Context, and the right hand two columns are the Instance, and Synonym. The Main Key and the Context are optional (i.e. do not necessarily exist for each Concept).

Each Concept is unique. That is, there is a unique Concept in each row of the dictionary. The Concepts contained in the ECD are candidates to form columns defining a matrix data base design. Each Concept has associated therewith one or more Instances. The Instances are the kernel or root of the word (e.g. 'do' for 'does', 'did', 'done'), and could include Synonyms.

A Concept is for example a "company', and the Instances could include "IBM," with a Synonym of "International Business Machines." The Context for a "company" could be another Concept, such as "transaction." So unless there is an Instance of a "transaction," such as "joint venture", then "IBM" is not identified as a "company." Thus for example, "The blue giant", which can be defined as a synonym to "IBM," is understood as a "company" only in the Context of a "transaction" (or its Instances) in the sentence. Otherwise, for example "The blue giant" might be interpreted as a type of a whale. This allows for an Instance to belong to more than one Concept.

When free text input is received, the text is first parsed on the basis of the contents of the ECD. Each paragraph of the free text input is parsed into words. Roots are identified for each of the words. Parsing identifies the Concepts represented by the words, by finding the word roots or words in the ECD amongst the Instances. Rows in a database matrix are formed for each word found in the ECD. Each row comprises a record, with the columns of each record, i.e. the database table definition being the Concepts. The database is constructed paragraph-by-paragraph, on the fly. The output database is known as the Raw Relational Database (RRD). From the RRD, text can be extracted representing the bare essence of the paragraph. This extraction is referred to as a free text abstract, as described above in connection with FIG. 5. The latter is used both for verification and for quality assurance, as described below. For example, in describing relation with a vendor, if the lead time is missing, it is easily identified. The abstract is generated from one or more predefined templates that define connection words between the Instances.

Note that the dictionary is prepared in advance, i.e. before parsing input text, and can be updated to account for more and more Concepts. Since the domain of Concepts in which the dictionary is used is defined, this process asymptotically converges on a dictionary representing a high percentage of the Concepts encountered in the domain.

Operation of the system upon a free text input in a predetermined domain e.g. business, legal or financial, is now described.

Each of the software tools next described have a user interface for editing elements of the system. The software tools are used by the system while parsing free text. The system includes the software tools, but the system "learns" from the input processed and the content of databases or knowledge bases included in the software tools is enhanced as the system gains experience.

The ECD consists of five conceptual columns noted above: the Concept, the Main Key, the Context, the Instances, and the Synonym. For each Concept (such as company), a Context is defined in which this Concept is used, and then the Instances and Synonyms are defined. The Context and Synonym are optional. For each Concept there could be many Instances. The Context is required in any case in which there is an Instance which belongs to more than one Concept. That is, if an Instance may refer to more than one Concept, then only one Concept may include that Instance without having a Context also associated with the Instance, and all the other appearances of that Instance must have a Context associated with them. The Concept with which the Instance is associated absent a Context is the Default Concept. Each Context is itself a unique Concept that has Instances of its own.

The ECD has an option to include a Main Key level entry, which determines the design of the database. If it is not included, then the system has an internal, i.e. hard wired default. This field defines the Main Key of the database table.

An event rules tool includes logic rules that define the relationship among the Instances of the Concepts. The hypothesis or trigger to the rule, i.e. the if part, is an Instance of an event that is identified in the first parsing step. For example, suppose an event rule hypothesis for the Concept "business action", exists. If the Concept "business action" is found then the rule parser looks for the then part, which specifies that there should be Instances of the Concepts "companies" and "technologies." If these Concepts are found then the rule is true, and a new record is added to the database, as explained later.

An auxiliary knowledge software tool is built as a collection of rules that uses background knowledge to check validity, and quality, as well as automatically add information not found in the ECD to the database, based on built in rules. For example, if a legal action is described, then the auxiliary knowledge software tool checks whether the name of the law office is included. It may then add the address etc., for a particular name and also check that other desired parameters are present such as liability amount, expected time for resolution, etc.

The rules used in the auxiliary knowledge software tool depend upon whether it is used in the intracompany part or the intercompany part. In an internal application, i.e. in the intracompany part, the rules reflect the format that the company wants to impose on their own reports. In the case of the repository system, i.e. the intercompany part, the rules reflect desired automatic analysis parameters.

Figure 7:
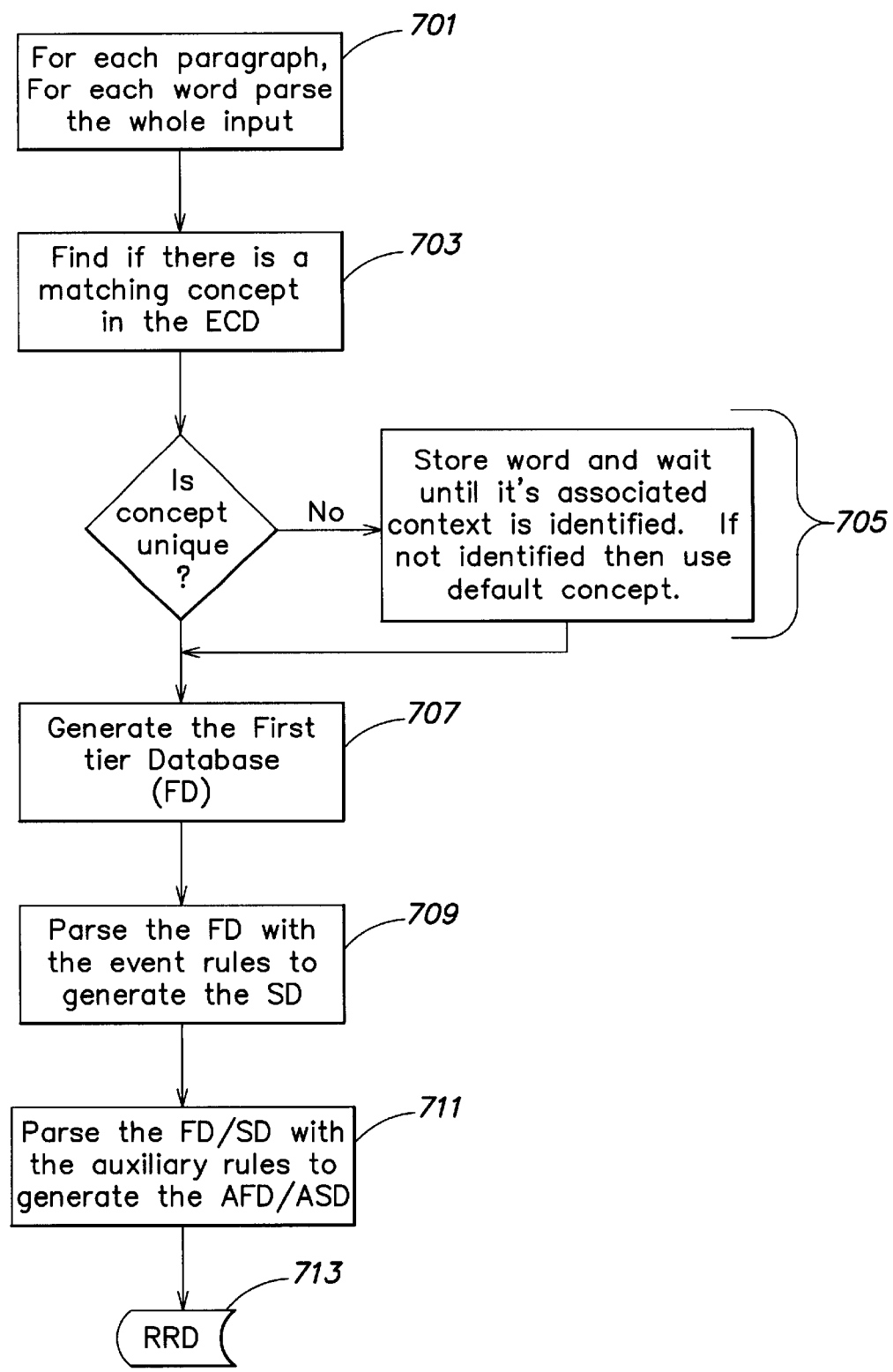
FIG. 7 is a flowchart of generation of a set of relational databases in accordance with one aspect of the invention.

The following is a detailed description to be read in connection with FIG. 7, explaining the generating of the First Tier Database (FD) and Second Tier Database (SD). This is Stage 1 of the overall method.

Generating the First Tier Database (FD)

The input to the system is one or more report documents formatted as free form text. The first step is dividing the text into paragraph and word units to be parsed 701, and then identifying in each sentence the instances (words), which have a concept associated with them 703. Ties, which occur when an instance has associated with it more than one concept, are broken according to the context associated with the document being input 705. For example, in the business context the "Blue Giant" is IBM, and "Apple" is the computer company, while in other contexts, they may by whale type and fruit type, respectively.

For each paragraph of the input document, a list of concepts is generated that form tables of the database. The database entries are the instances, i.e. the relevant words of the input document, related to concepts in the ECD.

For the first paragraph the concepts form the table definition, and the entries are the instances, i.e. the words that existed in the free text of the input document. In the second paragraph, there will likely be some new and some existing entries. The new concepts are added, that is, a new table is generated, and filled with the entries of the instances. The tables are built on the fly keyed to a main key Concept having a Main Key value in the ECD, e.g. a company, a law suit, a person, etc. In case more than one Concept has a Main Key value, then the keys are organized into levels according to Main Key value, and the higher level Main Key is used. In case several Main Keys appear at the same highest level, the first appearance of the repeated Main Key is used.

The result of this step is a relational data base 707. The design of this relational database is not efficient for the purpose of the present invention, yet, but the free form text document is transformed by this step into a formatted one.

Generating the Second Tier Database (SD)

The input to this step is the FD and the event rules (ER), which are combined to generate additional tables which become part of the resultant database 709. The tables of the FD carry an understanding of the original text. However, this understanding cannot be readily derived from the FD. For example in the FD there may be a table for each company reported on, containing the information that they had some new business development, for example developing flat screen technology. In the SD it will be revealed that this is a joint venture between two companies. Thus, the table key of the SD is different from that of the FD, and the rows all comply with certain structured rules. This additional structure imposed on the information provides the user with another level of understanding of the text. Where the understanding level in the FD was that the ASCII combination of the letters "IBM" means a company and all the related knowledge, now the idea of, for example the concept "business action" represented by the instance "joint venture" is understood as associating two or more companies (using the first level understanding) with each other and with some technology area. This understanding is made use of in Stage 3 of the method.

Generating the Augmented FD/Augmented SD (AFD/ASD)

Now Auxiliary Knowledge (AK) is used to augment the FD, the SD or both 711. For example, a pointer may be added to a database record containing information about a person linking the person's history to the record, or a pointer may be added to a database record containing information on a company project linking descriptions of related projects to the record.

Validation and Verification

The AK may also be used for validation and verification. For example, rules about what should be in a litigation description are used to validate that all the appropriate fields are present, and verify the current entries, such as address, phone numbers, etc. Such issues go beyond the conventional data type verification and domain verification inherent in a conventional database definition.

The output of Stage 1 of the method is the RRD 713, which includes the FD, the SD, the AFD and the ASD.

An example of the Stage 1 processing is now illustrated using the input sentence, "ABC and XYZ are forming a joint venture to develop flat screen technology." For this example, the contents of the ECD are given by Table 2.

TABLE 2

| Concept | Main Key Level | Context | Instances |
|---|---|---|---|
| Company | 1 | Business Action | XYZ |
|  |  |  | ABC |
|  |  |  | IBM |
| Business Action |  |  | joint venture |
| Technology |  |  | flat screen |
|  |  |  | memory |

The event rules used to transform the FD into the SD are given in Table 3, as follows.

TABLE 3

| if Business Action then: | The necessary parts are: | Two or more companies/divisions |
|---|---|---|
|  | The optional parts are: | Technology |

The sentence is parsed in accordance with the contents of the ECD to form the AF, as now given in Table 4.

TABLE 4

| Record | Company | Business Action | Technology | Record Associated With |
|---|---|---|---|---|
| 1 | XYZ | joint venture | flat screen | 2 |
| 2 | ABC | joint venture | flat screen | 1 |

Next the contents of the FD of Table 4 are transformed into the SD by invoking any relevant event rules. The SD thus generated is given in Table 5.

TABLE 5

| Record Number | Action Type | Company | With Company | Action | Technology |
|---|---|---|---|---|---|
| 1 | Business | ABC | XYZ | form joint venture | flat screen |

Background knowledge, such as references to regulations applicable to reported activities are applied here to validate and to augment the FD. A pointer to such regulations may be inserted in the relevant record of the FD and the SD to generate the AFD and the ASD.

Diagonalization

The result of stage 1, the RRD, is the input to stage 2. Because of the way it is constructed the RRD could be a very sparse matrix, with many different topics. The Stage 2 processing clusters similar topics. This is most useful for the repository database, but may also find utility at the company level, especially if the reporting entity is part of a large organization, with many affiliated companies. The processing of Stage 2 shuffles the rows and columns so that a dense diagonal matrix is created, the Grouped Database (GD). Stage 2 processing may be applied to all the different component databases of the RRD, i.e. SD, FD, ASD, and AFD.

The GD is organized in such a manner as to enable the Stage 3 processing. The GD provides an additional benefit in that it is a more efficient way of saving the information contained in the databases that were created in Stage 1 processing.

Figure 8:
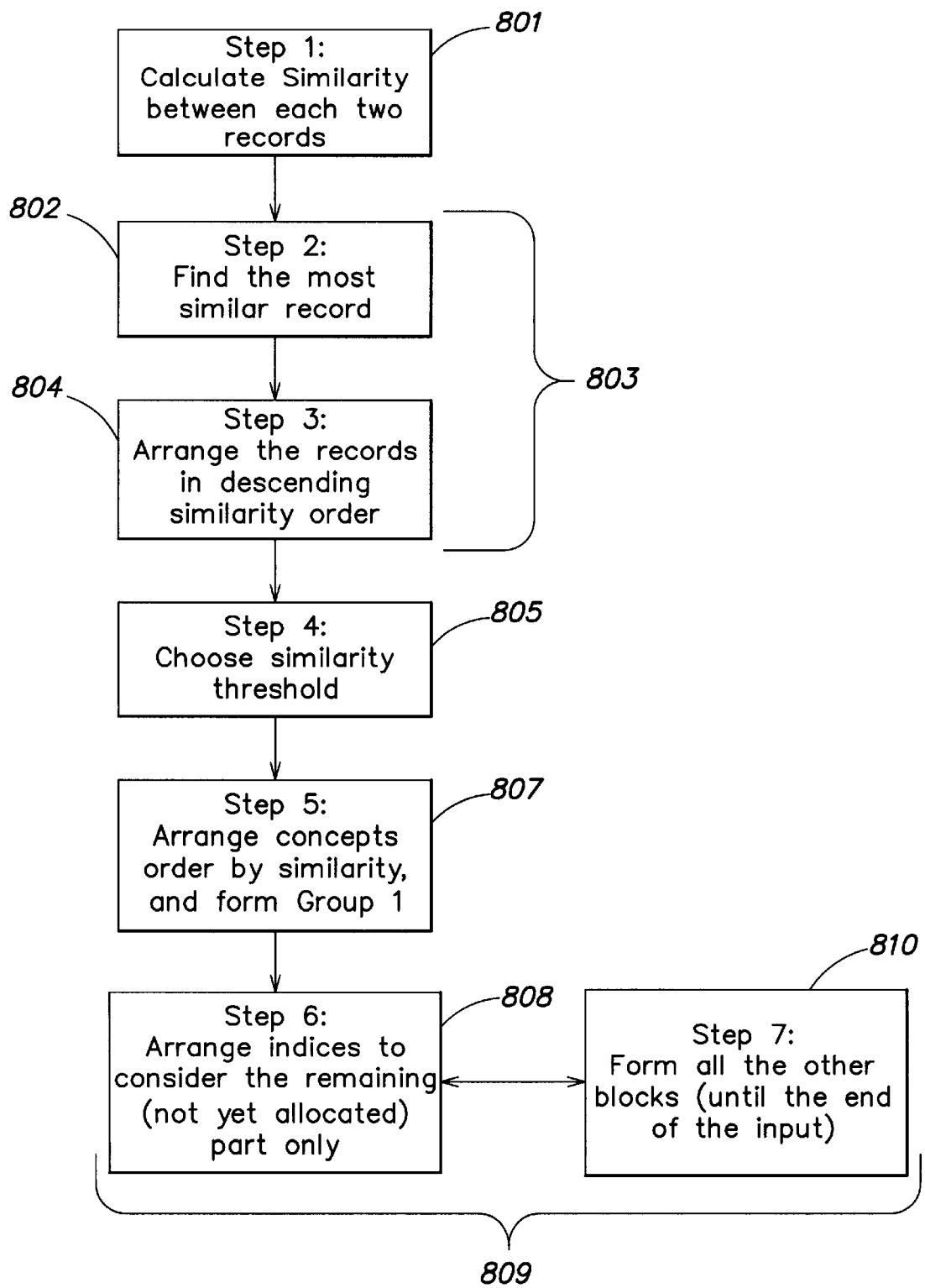
FIG. 8 is a flowchart of a diagonalization method according to another aspect of the invention.

Stage 2 processing, illustrated in FIG. 8, proceeds as follows.

First, for each two rows of the input database, a similarity index between them is calculated 801. The similarity index used is the number of columns for which both rows have an entry, i.e. in both rows the entry is not empty, divided by the total number of columns where either one of the two rows have an entry, i.e. in at least one row of the two rows the entry is not empty. This number is between zero, indicating no similarity at all, and one, indicating total similarity. Other similarity indices could be used, as will be understood by those skilled in this art.

Next, the rows are placed into order of their similarity indices 803, from highest down to a predetermined minimum threshold 805. Below the threshold, the rows may be in any convenient order. The rows having similarity indices which exceed the threshold constitute a Group 807, also referred to as a block.

The process is repeated 809 for the rows which are not yet part of a Group, until there are no more rows possible to arrange.

In somewhat more detail, the method is performed as follows. Assume $I(i,j)$ is the input matrix, and that $O(i,j)$ is the output matrix, and further that $i1, i2, \ldots, in$ are the rows in the matrix (the records), and that $j1, j2, \ldots, jp$ are the columns in the matrix (the concepts-the data base table design). Thus $I(i4,j5)$ for example is the entry corresponding to the fourth record and the fifth column of the input data matrix. $S(il, ik)$ is the similarity index between the lth and the kth record. The number of instances that exist at the lth record is $c(il)$, while $c(jk)$ would be the number of instances for the kth concept that exist for all records. Thus, the similarity index between two records is defined to be $S(il, ik) = c(il \cap ik)/c(il \cup ik)$. This index takes on values between 1, representing two records that deal with the same concepts and 0, representing two records which consider totally different concepts. Values falling between 0 and 1 show the relative similarity of two records, in the sense that the higher the index, the higher the similarity. The similarity index is not, however, necessarily linear.

Using the above notation, the method is applied to a database as follows. For each two rows, compute the similarity index between them 801. For each row, sum all the similarity indices, as follows: $S(il) =$ $$S(il) = \sum_{k=1}^{n} S(il, ik).$$

The row l with the maximum value for $S(il)$, $I^*$, is defined by $I^* = \arg(\max[S(il) \forall l=1, 2, \ldots, n])$ in step 802. By this definition, $I^*$ is the record l of maximum similarity to all other records. It has a similarity index value of $Si^* = \max[S(il) \forall l=1, 2, \ldots, n]$. Next, all the record numbers are arranged in an ordered descending list $Li^*$ according to the similarity of each record to $I^*$, with ties broken arbitrarily in step 804. Thus, the list $Li^* = (I^*k(1), \ldots, I^*k(n-1))$, where k identifies the number of the original record, $k \in \{(1, 2, \ldots, n)\}$, $k \neq I^*\}$, and the number in parenthesis is the place in the list of the associated record, also called the order number. For example $Si^*l(5) \geq Si^*k(6)$ means that the similarity of the lth record to $I^*$, is greater than or equal to the similarity of the kth record to $I^*$. A threshold T, for example, between 0.6 and 1.0 is now selected 805. The preferred value for T is 0.75. The value reflects the relative desire for similar data with respect to the size of the database. The list $Li^*$ is now trimmed at a cut-off point to form cut-off list $Li^*c$ such that similarity $Si^*q(n-1)$ of the last record q in the list is greater than or equal to T. Thus, $Li^*c = (I^*k(1), \ldots, I^*k(m))$, where the first m elements of $Li^*$ appear ($m \leq n-1$), and $Si^*k(m)$ is the similarity value of the last record in the $Li^*$ list that is with similarity index between $I^*$ and the last record greater than or equal to T. The rows of the database are then reordered such that $I^*$ occurs first, followed in order by the rows in the $Li^*c$ list 807. The records not in the list, follow in an arbitrary order.

A similar process is now undertaken for the columns, i.e. concepts. The result is a dense matrix for the first m rows. The process is similar to that applied to the rows, i.e. records, above. Consider as input a matrix with m rows (records) and q columns, which is the number of columns for which at least one of the chosen m records has an instance. The order of the concepts, i.e. the columns in the m×q matrix, is rearranged using the method described above with respect to the rows. However, the similarity is considered between the column vectors of the matrix, rather than the rows. At this point, the result is a new ordered m×q matrix, which includes m records and q concepts. This matrix is termed a Group. The groups are numbered, the first one being called Group 1.

Now the input matrix of n records and p concepts is reduced to eliminate Group 1 from further processing, so that the remainder of the matrix may be processed separately 808. Delete the m records and form a new input matrix with v=n−m records and r concepts, where r is derived from the original p concepts by deleting the concepts that do not have any instances in the remaining records. From the v×r matrix derive Group 2 in the same manner as above. Then recursively continue 810 until all records have been considered, and w blocks have been formed.

There are now w matrices defining groups derived from the initial matrix, but each group is defined by a dense matrix dealing with similar concepts. The GD, which is the final result of this process, ideally has a diagonal structure, as seen in the example, below.

Variations on the method of Stage 2 are possible, including for example conditional diagonalization. This applies when the groups should reflect the fact that a certain concept should exist. For example, if one wants to make an analysis of all the joint ventures among companies that file to the repository, then the similarity may be analyzed after filtering for that instance.

Tables 6 and 7 represent an example of the input and output of Stage 2 processing, respectively. Each row is numbered and concepts are represented by the letters a–h. The presence of an entry in a row for a concept is denoted by an asterisk (*). The diagonalized result is shown for a predetermined threshold of T=0.6. The resulting groups are {3, 5, 7, 8}, {4, 9, 6}, {1, 10} and {2}.

TABLE 6

|    | a | b | c | d | e | f | g | h |
|----|---|---|---|---|---|---|---|---|
| 1  | * | * | * |   |   |   |   |   |
| 2  | * |   |   | * |   |   |   |   |
| 3  |   |   |   |   | * | * | * |   |
| 4  |   | * | * |   |   | * |   |   |
| 5  |   |   |   |   | * | * | * |   |
| 6  |   | * | * |   |   | * | * | * |
| 7  |   |   |   |   | * | * | * |   |
| 8  |   |   |   |   | * | * | * |   |
| 9  |   | * | * |   |   | * |   |   |
| 10 | * | * | * |   |   |   |   |   |

TABLE 7

|    | e | g | f | h | b | c | a | d |
|----|---|---|---|---|---|---|---|---|
| 3  | * | * | * |   |   |   |   |   |
| 5  | * | * | * |   |   |   |   |   |
| 7  | * | * | * |   |   |   |   |   |
| 8  | * | * | * |   |   |   |   |   |
| 4  |   | * | * |   | * | * |   |   |
| 9  |   | * | * |   | * | * |   |   |
| 6  |   | * | * | * | * | * |   |   |
| 1  |   |   |   |   | * | * | * |   |
| 10 |   |   |   |   | * | * | * |   |
| 2  |   |   |   |   |   |   | * | * |

Conclusion Black Box

Finally, in Stage 3 of the method, conclusions are reached and issues raised by the contents of the input document are identified. Identification of issues raised by the contents of a database is a particularly difficult problem. This is a very difficult task in any large database, especially when starting with a dynamic, data dependent free text input. However, the present invention makes such identifications as described below, after performing the two preparatory phases presented above and in view of a knowledge of the domain.

The input to this stage is the w groups, i.e. blocks from the GD generated in the previous stage, and the output is the Inferenced Database.

From a GD group, the software identifies rows having in common a missing column. This technique is especially effective when comparing such rows to a catalog. It is easy to observe changes in a pattern established over time by a specific company or a group of companies, For example, suppose the column for the Concept "inventory turnover" is missing. Although it is not necessary data, suppose further that it had been consistently reported in previous years. The question now arises, "Why is this data not reported this year?" This type of result is gathered with other, similar results, in the Questions Discoveries (QD) database.

Another example is that if many companies disclose, the potential monetary consequence of litigation, but some do not, then this entry in the matrix will be empty for them, and thus will be easily flagged and identified as missing.

In other cases, a column may be added over time. This may lead to a new automatic conclusion, for example, about special new relations between companies.

The GD of the SD generates also the Company Analysis Report (CAR), based on the concepts that are filled.

A tool useful in this stage and in the next stage is the Catalog. The Catalog defines for a disclosure area, what are the columns, i.e. fields that are required and what fields are optional. Thus, the disclosure can be checked for completeness, and the quality of the document can be evaluated.

In an example of the use of the Catalog, the input may be the result of Stage 2 diagonalization, i.e. the GDs. The output is an Inference Database (ID) plus QD (Question Discovery) and CAR (Company Analysis Report). The Catalog defines a Database Design Template for a variety of issues, such as the required disclosure of legal issues and also desired optional issues. For example, the potential value "damage" for litigation matters may be defined as "not required."

Verification and validation of a current report at either the intracompany level or the intercompany level may proceed as follows. If a concept is missing, or is sparse, in the current report and the Catalog indicates it to be either mandatory or optional, then it is included in the QD. If an instance is mostly missing from current reports that has appeared in previous years' reports, then that instance should be added to the QD. If the current report is compared to reports of a group of related companies, concepts common to the related companies but missing from the current report may be added to the QD. Finally, instances of concepts may be compared to benchmarks, leading indicators of industry averages. If the current report includes instances of a concept which are substantially different than the benchmark, leading indicator or average used, then that concept may be added to the QD. The process which performs verification and validation may have embedded therein to formulate specific questions in connection with the items added to the QD.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

- A-1 -

APPENDIX A
FORM TYPES ACCEPTED FOR ELECTRONIC FILING

SECURITIES ACT FORM TYPES ACCEPTED BY EDGAR

| FORM TYPE | DESCRIPTION | HEADER SUBMISSION TYPE |
|---|---|---|
| Form F-1 | Registration statement for certain foreign private issuers | |
| | Initial statement | F-1 |
| | Pre-effective amendments | F-1/A |
| | Post-effective amendments | POS AM |
| Form F-2 | Registration statement for certain foreign private issuers | |
| | Initial statement | F-2 |
| | Pre-effective amendments | F-2/A |
| | Post-effective amendments | POS AM |
| | Registration of securities pursuant to dividend or interest reinvestment plans | |
| | Initial statement | F-2D |
| | Post-effective amendments | F-2DPOS |
| Form F-3 | Registration statement for certain foreign private issuers offered pursuant to certain types of transactions | |
| | Initial statement | F-3 |
| | Pre-effective amendments | F-3/A |
| | Post-effective amendments | POS AM |
| | Registration of securities pursuant to dividend or interest reinvestment plans | |
| | Initial statement | F-3D |
| | Post-effective amendments | F-3DPOS |
| Form F-4 | Registration statement for foreign private issuers issued in certain business combination transactions | |
| | Initial statement | F-4 |
| | Pre-effective amendments | F-4/A |
| | Post-effective amendments | POS AM |

- A-2 -

| Form F-6 | Registration of depositary shares evidenced by American Depositary Receipts Filing to become effective other than immediately upon filing | |
|---|---|---|
| | Initial statement | F-6 |
| | Pre-effective amendments | F-6/A |
| | Post-effective amendments | POS AM |
| | Filing to become effective immediately upon filing | |
| | Initial statement | F-6EF |
| | Pre-effective amendments | F-6EF/A |
| | Post-effective amendments | F-6 POS |
| Form S-1 | General form of registration statement | |
| | Initial statement | S-1 |
| | Pre-effective amendments | S-1/A |
| | Post-effective amendments | POS AM |
| Form S-2 | Registration of securities of certain issuers | |
| | Initial statement | S-2 |
| | Pre-effective amendments | S-2/A |
| | Post-effective amendments | POS AM |
| Form S-3 | Registration statement for certain issuers offered pursuant to certain types of transactions | |
| | Initial statement | S-3 |
| | Pre-effective amendments | S-3/A |
| | Post-effective amendments | POS AM |
| | Registration of securities pursuant to dividend or interest reinvestment plans which become effective automatically upon filing | |
| | Initial statement | S-3D |
| | Post-effective amendments | S-3DPOS |
| Form S-4 | Registration of securities issued in business combination transactions | |
| | Initial statement | S-4 |
| | Pre-effective amendments | S-4/A |

- A-3 -

|  |  |  |
|---|---|---|
|  | Post-effective amendments | POS AM |
|  | Securities issued in connection with the formation of a bank or savings and loan, or holding company in compliance with General Instruction G |  |
|  | Initial statement | S-4EF |
|  | Pre-effective amendments | S-4EF/A |
|  | Post-effective amendments | S-4 POS |
| Form S-8 | Securities to be offered to employees pursuant to employee benefit plans |  |
|  | Initial statement | S-8 |
|  | Post-effective amendments | S-8 POS |
| Form S-11 | For securities of certain real estate companies |  |
|  | Initial statement | S-11 |
|  | Pre-effective amendments | S-11/A |
|  | Post-effective amendments | POS AM |
| Form S-20 | For standardized options |  |
|  | Initial statement | S-20 |
|  | Pre-effective amendments | S-20/A |
|  | Post-effective amendments | POS AM |
| Form SB-1 | Optional form for the registration of securities to be sold to the public by small business issuers |  |
|  | Initial statement | SB-1 |
|  | Pre-effective amendments | SB-1/A |
|  | Post-effective amendments | POS AM |
| Form SB-2 | Optional form for the registration of securities to be sold to the public by small business issuers |  |
|  | Initial statement | SB-2 |
|  | Pre-effective amendments | SB-2/A |
|  | Post-effective amendments | POS AM |
| ALL FORMS | Post-effective Amendments (other than those indicated above) |  |
|  | Post-effective amendments | POS AM |

- A-4 -

```
PROSPECTUSES FILED PURSUANT TO RULE 424
                Filed pursuant to Rule 424(a)   424A
                Filed pursuant to
                Rule 424(b)(1)                  424B1
                Filed pursuant to
                Rule 424(b)(2)                  424B2
                Filed pursuant to
                Rule 424(b)(3)                  424B3
                Filed pursuant to
                Rule 424(b)(4)                  424B4
                Filed pursuant to
                Rule 424(b)(5)                  424B5

FILINGS PURSUANT TO THE TRUST INDENTURE ACT

305B2           Initial statement               305B2
                Pre-effective amendments        305B2/A T-3             Application for qualification
                of trust indentures
                    Initial statement           T-3
                    Pre-effective amendments    T-3/A NOTE:
"Form types" T-1 and T-2 are not used as stand-alone forms on
the EDGAR system.  They are filed as EX-25 to registration
statements.

MISCELLANEOUS FILINGS
                Delaying amendment              DEL AM
                Information pursuant to
                    Item 4 of Form S-6          UNDER
                Amendment to information
                    pursuant to Item 4 of
                    Form S-6                    UNDER/A
                Registration Withdrawal
                    Request                     RW
                Amendment Withdrawal
                    Request                     AW
```

TABLE 1A
SECURITIES ACT FORM TYPES PROPOSED FOR EDGAR

In February 1995, the Commission issued proposals which would, among other matters, necessitate the addition of several new form types to EDGAR in order to implement two solutions to prospectus delivery issues arising in connection with the change to T+3 securities transaction settlement. See Release No. 33-7141(February 21, 1995) [60 FR 10724].

-A-5-

In anticipation of these proposals being adopted, the EDGAR system has been modified to accommodate this rulemaking. If the proposals are adopted, the new form types would include:

| FORM TYPE | DESCRIPTION | HEADER SUBMISSION TYPE |
|---|---|---|
| Form F-1MEF | Registration pursuant to proposed Securities Act Rule 462(b) of up to an additional 20% of securities for an offering that was registered on a Form F-1. | F-1MEF |
| Form F-2MEF | Registration pursuant to proposed Securities Act Rule 462(b) of up to an additional 20% of securities for an offering that was registered on a Form F-2. | F-2MEF |
| Form F-3MEF | Registration pursuant to proposed Securities Act Rule 462(b) of up to an additional 20% of securities for an offering that was registered on a Form F-3. | F-3MEF |
| Form S-1MEF | Registration pursuant to proposed Securities Act Rule 462(b) of up to an additional 20% of securities for an offering that was registered on a Form S-1. | S-1MEF |
| Form S-2MEF | Registration pursuant to proposed Securities Act Rule 462(b) of up to an additional 20% of securities for an offering that was registered on a Form S-2. | S-2MEF |
| Form S-3MEF | Registration pursuant to proposed Securities Act Rule 462(b) of up to an additional 20% of securities for an offering that was registered | |

- A-6 -

```
                    on a Form S-3.                       S-3MEF

Form S-11MEF    Registration pursuant to
                   proposed Securities Act Rule
                   462(b) of up to an additional
                   20% of securities for an
                   offering that was registered
                   on a Form S-11.                       S-11MEF Form SB-1MEF    Registration pursuant to
                   proposed Securities Act Rule
                   462(b) of up to an additional
                   20% of securities for an
                   offering that was registered
                   on a Form SB-1.                       SB-1MEF Form SB-2MEF    Registration pursuant to
                   proposed Securities Act Rule
                   462(b) of up to an additional
                   20% of securities for an
                   offering that was registered
                   on a Form SB-2.                       SB-2MEF POS462B         Post-effective amendment to
                   proposed Securities Act Rule
                   462(b) registration statement         POS462B

PROSPECTUSES FILED PURSUANT TO PROPOSED RULEMAKING

Filed pursuant to Rule 424(b)(6)    424B6      B-11
                   Filed pursuant to Rule 424(e)       424E       B-11
```

If these proposals are adopted, a notice to this effect will be issued in the Federal Register, SEC News Digest, and posted on the EDGAR Bulletin Board.

- A-7 -

SECURITIES EXCHANGE ACT - PROXY MATERIALS AND INFORMATION
STATEMENTS FILED PURSUANT TO SECTION 14
FORM TYPES ACCEPTED BY EDGAR

| FORM TYPE | DESCRIPTION | HEADER SUBMISSION TYPE |
|---|---|---|
| MATERIAL FILED PURSUANT TO SECTION 14 | | |
| PRELIMINARY PROXY SOLICITING MATERIALS | | |
| | Preliminary proxy statements relating to merger or acquisition | PREM14A |
| | Preliminary proxy statements-contested solicitations | PREC14A |
| | Preliminary special meeting | PRES14A |
| | Non-management preliminary proxy statements not involving contested solicitations | PREN14A |
| | All other preliminary proxy statements | PRE 14A |
| PRELIMINARY INFORMATION STATEMENTS | | |
| | Preliminary information statements relating to merger or acquisition | PREM14C |
| | Preliminary information statements-contested solicitations | PREC14C |
| | Preliminary information statements--special meeting | PRES14C |
| | All other preliminary information statements | PRE 14C |
| REVISED PRELIMINARY MATERIALS | | |
| | Proxy soliciting materials | PRER14A |
| | Non-management revised preliminary proxy soliciting materials for both contested solici- | |

- A-8 -

```
                  tations and other situations    PRRN14A

Information statements          PRER14C

SCHEDULE 13E-3 FILED AS PART OF PROXY MATERIALS

Initial Statement-preliminary
                  form                             PRE13E3
                  Amendments-preliminary
                  materials                        PRE13E3/A
                  Schedule filed as definitive
                  materials                        DEF13E3
                  Amendments - definitive          DEF13E3/A
                  materials

DEFINITIVE MATERIALS (PROXY MATERIALS)

Definitive proxy statement
                  relating to merger or
                  acquisition                      DEFM14A
                  Definitive proxy statement in
                  connection with contested
                  solicitations                    DEFC14A
                  Definitive proxy statement
                  filed by non-managment not in
                  connection with contested
                  solicitations                    DEFN14A
                  All other definitive proxy
                  statements                       DEF 14A
                  Revised definitive proxy state-
                  ment filed by non-management     DFRN14A
                  Revised proxy soliciting
                  materials-definitive             DEFR14A
                  Additional proxy soliciting
                  materials-definitive             DEFA14A
                  Additional proxy soliciting
                  materials-definitive-filed
                  by non-management                DFAN14A
                  Definitive proxy statement for
                  special meeting                  DEFS14A Notice of exempt solicitation    PX14A6G Notice of exempt preliminary     PX14A6N
                  roll-up communication

DEFINITIVE MATERIALS (INFORMATION STATEMENTS)
```

- A-9 -

| | | |
|---|---|---|
| | Definitive information statement relating to merger or acquisition | DEFM14C |
| | Definitive information statement - contested solicitations | DEFC14C |
| | All other definitive information statements | DEF 14C |
| | Additional information statement materials-definitive | DEFA14C |
| | Revised information statement materials - definitive | DEFR14C |
| | Definitive information statement for special meeting | DEFS14C |

SECURITIES EXCHANGE ACT - REGISTRATION AND REPORT FORM TYPES ACCEPTED BY EDGAR

| FORM TYPE | DESCRIPTION | HEADER SUBMISSION TYPE |
|---|---|---|
| REGISTRATION STATEMENTS | | |
| Form 8A | Registration of certain classes of securities pursuant to section 12(b) or (g) | |
| | Registration of securities pursuant to section 12(b) | |
| |   Initial filing | 8-A12B |
| |   Amendments | 8-A12B/A |
| | Registration of listed debt securities pursuant to section 12(b) - filing to become effective automatically upon filing | 8A12BEF |
| | Registration of listed debt securities pursuant to section 12(b) - filing to become effective simultaneously with the effectiveness of a concurrent Securities Act registration statement | |
| |   Initial filing | 8A12BT |
| |   Amendments | 8A12BT/A |
| | Registration of securities pursuant to section 12(g) | |

- A-10 -

|  |  |  |  |
|---|---|---|---|
|  |  | Initial filing | 8-A12G |
|  |  | Amendments | 8-A12G/A |
|  | Form 8B | Registration of securities of certain successor issuers pursuant to section 12(b) or (g) |  |
|  |  | Registration of securities pursuant to section 12(b) |  |
|  |  | Initial filing | 8-B12B |
|  |  | Amendments | 8-B12B/A |
|  |  | Registration of securities pursuant to section 12(g) |  |
|  |  | Initial filing | 8-B12G |
|  |  | Amendments | 8-B12G/A |
|  | Form 10 | General form for registration of securities pursuant to section 12(b) or (g) |  |
|  |  | Registration of securities pursuant to section 12(b) |  |
|  |  | Initial filing | 10-12B |
|  |  | Amendments | 10-12B/A |
|  |  | Registration of securities pursuant to section 12(g) |  |
|  |  | Initial filing | 10-12G |
|  |  | Amendments | 10-12G/A |
|  | FORM 10-SB | Registration of securities for small business issuers pursuant to section 12(b) |  |
|  |  | Initial filing | 10SB12B |
|  |  | Amendments | 10SB12B/A |
|  |  | Registration of securities for small business pursuant to section 12(g) |  |
|  |  | Initial filing | 10SB12G |
|  |  | Amendments | 10SB12G/A |
|  | Form 20F | Registration of securities of foreign private issuers pursuant to section 12(b) or (g) |  |

- A-11 -

```
                     Registration of securities
                     pursuant to section 12(b)
                        Initial filing           20FR12B
                        Amendments               20FR12B/A Registration of securities
                     pursuant to section 12(g)
                        Initial filing           20FR12G
                        Amendments               20FR12G/A Form 18              Registration of securities of
                     foreign governments or politi-
                     cal subdivisions thereof
                     pursuant to section 12(b)
                     or 12(g)

Registration of securities
                     pursuant to section 12(b)
                        Initial filing           18-12B
                        Amendments               18-12B/A Registration of securities
                     pursuant to section 12(g)
                        Initial filing           18-12G
                        Amendments               18-12G/A

ANNUAL, QUARTERLY, AND PERIODIC REPORTS

Annual Report to Security Holders    ARS

NOTE: This submission type is to be used when furnishing the
annual report to security holders for the information of the
Commission pursuant to Rule 14a-3(c) or Rule 14c-3(b). Portions
of the annual report to security holders filed with the
Commission as part of a registration statement or periodic
report
should be filed as Exhibit 13, as provided by Item 601 of
Regulation S-K and S-B.

Form 6-K             Report of foreign issuer
                     pursuant to Rules 13a-16 and
                     15d-16
                        Initial filing           6-K
                        Amendments               6-K/A Form 10-Q            Quarterly and transition
                     report filed pursuant
```

- A-12 -

```
                        to sections 13 or 15(d)
                          Initial filing              10-Q
                          Amendments                  10-Q/A
                        Transition reports pursuant
                        to rule 13a-10 or 15d-10
                          Initial filing              10-QT
                          Amendments                  10-QT/A Form 10-QSB         Optional form for quarterly
                        and transition reports of
                        small business issuers under
                        section 13 or 15(d)
                          Initial filing              10QSB
                          Amendments                  10QSB/A Form 10-K405        Annual and transitional
                        reports pursuant to
                        Sections 13 and 15(d) where
                        the Regulation S-K Item 405 box
                        on the cover page (relating to
                        Section 16(a) reports)
                        is checked
                          Initial filing              10-K405
                          Amendments                  10-K405/A
                        Transition reports
                        pursuant to Rule
                        13a-10 or 15d-10
                          Initial filing              10KT405
                          Amendments                  10KT405/A Form 10-K           Annual and transition reports
                        pursuant to section 13
                        and 15(d) where the Regulation
                        S-K Item 405 box (relating to
                        Section 16(a) reports) on the
                        cover page is NOT checked
                          Initial filing              10-K
                          Amendments                  10-K/A
                        Transition reports pursuant
                        to rule 13a-10 or 15d-10
                          Initial filing              10-KT
                          Amendments                  10-KT/A Form 10KSB405       Optional form for annual and
                        transition reports of small
                        business issuers under Section
                        13 or 15(d) where the Regula-
                        tion S-B Item 405 box on the
```

- A-13 -

```
                         cover page (relating to Section
                         16(a) reports) is checked
                            Initial filing            10KSB40
                            Amendments               10KSB40/A
   Form 10-KSB     Optional form for annual and
                         transition reports of small
                         business issuers under
                         section 13 or 15(d) where the
                         Regulation S-B Item 405 box
                         (relating to Section 16(a) reports)
                         on the cover page is NOT checked
                            Initial filing            10KSB
                            Amendments               10KSB/A
   Form 8-K       Current report
                            Initial filing            8-K
                            Amendments               8-K/A
                         Notification of securities of
                         successor issuers deemed to
                         be registered pursuant to
                         section 12(g)
                            Initial filing            8-K12G3
                            Amendments               8-K12G3/A
                         Notification of assumption of
                         duty to report by successor
                         issuer
                            Initial filing            8-K15D5
                            Amendments               8-K15D5/A
   Form 11-K      Annual report of employee stock
                         purchase, savings and similar
                         plans
                            Initial filing            11-K
                            Amendments               11-K/A
                         Pursuant to rule 13a-10
                         or 15d-10
                            Initial filing            11-KT
                            Amendments               11-KT/A
   Form 18-K      Annual report for foreign
                         governments and political
                         subdivisions
                            Initial filing            18-K
                            Amendments               18-K/A
   Form 20F       Annual and transition report
                         of foreign private issuers
                         pursuant to sections
                         13 or 15(d)
                            Initial filing            20-F
```

-A-14-

|  |  |  |
|---|---|---|
|  | Amendments | 20-F/A |
| Form 12b-25 | Notification of late filing | |
|  | Special report pursuant to section 15d-2 | |
|  | Initial filing | NT 15D2 |
|  | Amendments | NT 15D2/A |
|  | Form 10-Q or 10-QSB | |
|  | Initial filing | NT 10-Q |
|  | Amendments | NT 10-Q/A |
|  | Form 10-K 405, 10-K, 10-KSB 405, or 10-KSB | |
|  | Initial filing | NT 10-K |
|  | Amendments | NT 10-K/A |
|  | Form 11-K | |
|  | Initial filing | NT 11-K |
|  | Amendments | NT 11-K/A |
|  | Form 20-F | |
|  | Initial filing | NT 20-F |
|  | Amendments | NT 20-F/A |
| Form 15 | Certification of termination of registration of a class of security under Section 12(g) or notice of suspension of duty to file reports pursuant to Section 13 and 15(d) of the Act | |
|  | Section 12(b) | |
|  | Initial Filing | 15-12B |
|  | Amendments | 15-12B/A |
|  | Section 12(g) | |
|  | Initial filing | 15-12G |
|  | Amendments | 15-12G/A |
|  | Section 13 and 15(d) | |
|  | Initial filing | 15-15D |
|  | Amendments | 15-15D/A |
| See Rule 15d-2 | Special Financial Report pursuant to Rule 15d-2 | |
|  | Initial filing | SP 15D2 |
|  | Amendments | SP 15D2/A |
| Form 10-C | Report by issuer of securities | |

- A-15 -

```
                    quoted on NASDAQ interdealer
                    quotation system, pursuant
                    to section 13 or 15(d)
                        Initial filing              10-C        B-7
                        Amendments                  10-C/A      B-7

Form 13F-E      Quarterly reports filed by    (Not Included in B)
                    institutional managers
                        Initial filing              13F-E   Appendix
    H
                        Amendments                  13F-E/A Appendix
    H Request for Withdrawal*                         RW Amendment Withdrawal*                           AW

*   Form Types RW and AW are suitable only for registration
        statement withdrawals and amendments.

Schedule        General statement of bene-
       13D             ficial ownership
                        Initial statement           SC 13D
                        Amendments                  SC 13D/A n/a          Statement of issuer required by
                    Rule 13e-1
                        Initial statement           SC 13E1
                        Amendments                  SC 13E1/A Schedule        Going private transaction by
      13E-3            certain issuers
                        Initial statement           SC 13E3
                        Amendments                  SC 13E3/A Schedule        Issuer tender offer statement
      13E-4             Initial statement           SC 13E4
                        Amendments                  SC 13E4/A Schedule        Statement of beneficial owner-
       13G             ship by certain persons
                        Initial statement           SC 13G
                        Amendments                  SC 13G/A Schedule        Tender offer statement
      14D1              Initial statement           SC 14D1
                        Amendments                  SC 14D1/A
```

-A-16-

| Schedule 14D-9 | Solicitation/recommendation statements | |
| --- | --- | --- |
| | Initial statement | SC 14D9 |
| | Amendments | SC 14D9/A |
| n/a | Statement re change in majority of directors pursuant to Rule 14f-1 | |
| | Initial statement | SC 14F1 |
| | Amendments | SC 14F1/A |

PUBLIC UTILITY HOLDING COMPANY ACT FORM TYPES ACCEPTED BY EDGAR

| FORM TYPE | DESCRIPTION | HEADER SUBMISSION TYPE |
| --- | --- | --- |
| Form U-1 | Application or declaration under the act | |
| | Initial filing | U-1 |
| | Pre-effective amendments | U-1/A |
| | Post-effective amendments | POS AMC |
| Form U-13-1 | Application for approval of mutual service company filed pursuant to Rule 88 | |
| | Initial filing | U-13-1 |
| | Amendments | U-13-1/A |
| Form U-3A3-1 | Twelve-month statement by bank claiming exemption from provisions of the act pursuant to Rule 3 | |
| | Initial statement | U-3A3-1 |
| | Amendments | U-3A3-1/A |
| Form U-7D | Certificate concerning lease of a utility facility filed pursuant to Rule 7(d) | |
| | Initial filing | U-7D |
| | Amendments | U-7D/A |
| Form U-R-1 | Declaration as to solicitations filed pursuant to Rule 62 | |
| | Initial filing | U-R-1 |
| | Amendments | U-R-1/A |

- A-17 -

| Form 45B-3 | Transitional statement concerning extensions of credit filed pursuant to Rule 45(b)(3) | |
| --- | --- | --- |
| | Initial statement | 45B-3 |
| | Amendments | 45B-3/A |
| Form 35 APP | Statement concerning proposed transaction for which no form of application is prescribed filed pursuant to Rule 20(e) | |
| | Initial statement | 35-APP |
| | Amendments | 35-APP/A |
| Form 35-CERT | Certificate concerning terms and conditions filed pursuant to Rule 24 | |
| | Initial filing | 35-CERT |
| | Amendments | 35-CERT/A |
| Form U-13-60 | Annual report for mutual and subsidiary service companies filed pursuant to Rule 94 | |
| | Initial filing | U-13-60 |
| | Amendments | U-13-60/A |
| Form U-3A-2 | Statement by holding company claiming exemption from provisions of the act pursuant to Rule 2 | |
| | Initial statement | U-3A-2 |
| | Amendments | U-3A-2/A |
| Form U-6B-2 | Certificate of notification of security issue, renewal or guaranty filed pursuant to Rule 20(d) | |
| | Initial filing | U-6B-2 |
| | Amendments | U-6B-2/A |
| Form U5A | Notification of registration filed under section 5(a) of the act | |
| | Initial filing | U5A |
| | Amendments | U5A/A |
| Form U5B | Registration statement filed under section 5 of the act | |

- A-18 -

|  | | | |
|---|---|---|---|
| | | Initial statement | U5B |
| | | Amendments | U5B/A |
| | Form U5S | Annual report for holding companies registered pursuant to section 5 of the act | |
| | | Initial filing | U5S |
| | | Amendments | U5S/A |
| | Form U-12(I)A | Statement pursuant to section 12(i) of the Act by person employed or retained by a registered holding company or a subsidiary thereof | |
| | | Initial statement | U-12-IA |
| | | Amendments | U-12-IA/A |
| | Form U-12(I)B | Annual statement pursuant to section 12(i) of the Act by person regularly employed or retained by a registered holding company or a subsidiary thereof | |
| | | Initial statement | U-12-IB |
| | | Amendments | U-12-IB/A |
| | Form U-13E-1 | Report by affiliate service companies or independent service companies filed pursuant to Rule 95 | |
| | | Initial filing | U-13E-1 |
| | | Amendments | U-13E-1/A |
| | Form U-33-S | Annual report Concerning Foreign Utility Companies pursuant to Section 33(e) of the Act | |
| | | Initial filing | U-33-S |
| | | Amendments | U-33-S/A |
| | Form U-57 | Notification of Foreign Utility Company Status under Section 33(a)(2) of the Act | |
| | | Initial filing | U-57 |
| | | Amendments | U-57/A |

- A-19 -

INVESTMENT COMPANY ACT FILINGS FORM TYPES ACCEPTED BY EDGAR

| FORM TYPE | DESCRIPTION | HEADER SUBMISSION TYPE |
|---|---|---|
| Form S-1 & Form S-3 | Registration statement for face-amount certificate companies | |
| | Initial statement | S-1 |
| | Pre-effective amendments | S-1/A |
| | Post-effective amendments | POS AMI |
| | Initial statement | S-3 |
| | Pre-effective amendments | S-3/A |
| | Definitive materials | 497 |
| | Certification of no change in definitive materials | 497J |
| Form N-1 & Form N-1A | Registration statement for open-end management investment companies | |
| | Initial statement | N-1 |
| | Pre-effective amendments | N-1/A |
| | Initial statement | N-1A |
| | Pre-effective amendments | N-1A/A |
| | Initial statement with 24f-2 election (This filing cannot be submitted as a 1940 Act only filing) | N-1A EL |
| | Pre-effective amendments to filing made on form N-1A EL | N-1A EL/A |
| | Post-Effective amendments | |
| | Filed pursuant to Rule 485(a) | 485APOS |
| | Filed pursuant to Rule 485(a) with additional shares under 24e-2 (This filing cannot be submitted as a 1940 Act only filing) | 485A24E |
| | Filed pursuant to Rule 485(a) with 24f-2 election (This filing cannot be submitted as a 1940 Act only | |

- A-20 -

|  |  |  |
|---|---|---|
|  | filing) | 485A24F |
|  | Filed pursuant to Rule 485(b) | 485BPOS |
|  | Filing submitted under the 1940 Act only | POS AMI |
|  | Filed pursuant to Rule 485(b) with additional shares under 24e-2 (This filing cannot be submitted as a 1940 Act only filing) | 485B24E |
|  | Filed pursuant to Rule 485(b) with 24f-election (This filing cannot be submitted as a 1940 Act only filing) | 485B24F |
|  | Definitive materials | 497 |
|  | Certification of no change in definitive materials | 497J |
| Form N-2 | Registration statement for closed-end investment companies |  |
|  | Initial statement | N-2 |
|  | Pre-effective amendments | N-2/A |
|  | Post-effective amendments | POS AMI |
|  | Definitive materials | 497 |
|  | Certification of no change in definitive materials | 497J |
| Form N-3 | Registration statement for separate accounts (management investment companies) |  |
|  | Initial statement | N-3 |
|  | Pre-effective amendments | N-3/A |
|  | Initial statement with 24f-2 election (This filing cannot be submitted as a 1940 Act only filing) | N-3 EL |
|  | Pre-effective amendments to filings made on form N-3 EL | N-3 EL/A |
|  | Post-effective amendments Filed pursuant to Rule 485(a) | 485APOS |

- A-21 -

|  |  |  |
|---|---|---|
|  | Filed pursuant to Rule 485(a) with additional shares under 24e-2 (This filing cannot be submitted as a 1940 Act only filing.) | 485A24E |
|  | Filed pursuant to Rule 485(a) with 24f-2 election (This filing cannot be submitted as a 1940 Act only filing.) | 485A24F |
|  | Filed pursuant to Rule 485(b) | 485BPOS |
|  | Filed pursuant to Rule 485(b) with additional shares under 24e-2 (This filing cannot be submitted as a 1940 Act only filing.) | 485B24E |
|  | Filed pursuant to Rule 485(b) with 24f-2 election (This filing cannot be submitted as a 1940 Act only filing.) | 485B24F |
|  | Filed pursuant to Rule 8b-16 of the 1940 Act (for filings made under the 1940 Act only) | POS AMI |
|  | Definitive materials | 497 |
|  | Certification of no change in definitive materials | 497J |
| Form N-4 | Registration statement for separate accounts (unit investment trusts) |  |
|  | Initial statement | N-4 |
|  | Pre-effective amendments | N-4/A |
|  | Initial statement with 24f-2 election (This filing cannot be submitted as a 1940 Act only filing) | N-4 EL |
|  | Pre-effective amendments to filings made on form N-4 EL | N-4 EL/A |

- A-22 -

```
                    Pre-effective pricing amend-
                    ments filed pursuant to
                    Rule 487                            487

Post-effective amendments
            Filed pursuant to Rule 485(a)  485APOS
            Filed pursuant to Rule 485(a)
              with additional shares under
              24e-2
              (This filing cannot be
              submitted as a 1940 Act only
              filing.)                     485A24E
            Filed pursuant to Rule 485(a)
              24f-2 with election
              (This filing cannot be
              submitted as a 1940 Act only
              filing.)                     485A24F
            Filed pursuant to Rule 485(b)  485BPOS Filed pursuant to Rule 485(b)
              with additional shares under
              24e-2
              (This filing cannot be
              submitted as a 1940 Act only
              filing.)                     485B24E
            Filed pursuant to Rule 485(b)
              with 24f-2 election
              (This filing cannot be
              submitted as a 1940 Act only
              filing.)                     485B24F Filed pursuant to Rule 8b-16
              of the 1940 Act (for filings
              made under the 1940 Act only) POS AMI Definitive materials             497
            Certification of no change
            in definitive materials        497J Form S-6  Registration statement for unit
          investment trusts
            Initial statement              S-6
            Pre-effective amendments       S-6/A
            Initial statement with 24f-2
              election                     S-6EL24
            Pre-effective amendments to
              filings made on S-6EL24      S-6EL24/A
```

- A-23 -

```
                    Pre-effective pricing amend-
                    ments filed pursuant to
                    Rule 487                        487

Post-effective amendments
                      Filed pursuant to Rule 485(a) 485APOS
                      Filed pursuant to Rule 485(a)
                        with additional shares
                        under 24e-2                 485A24E
                      Filed pursuant to Rule 485(a)
                        with 24f-2 election         485A24F
                      Filed pursuant to Rule 485(b) 485BPOS Filed pursuant to Rule 485(b)
                        with additional shares under
                        24e-2                       485B24E
                      Filed pursuant to Rule 485(b)
                        with 24f-2 election         485B24F Definitive materials            497
                      Certification of no change
                      in definitive materials       497J Form N-5    Registration statement for
                    small business investment
                    companies
                      Initial statement             N-5
                      Pre-effective amendments      N-5/A
                      Post-effective amendments     POS AMI Definitive materials            497
                      Certification of no change
                      in definitive materials       497J Form N-14   Registration statement for
                    investment companies business
                    combination
                      Initial statement             N-14
                      Pre-effective amendments      N-14/A
                      Initial statement with 24f-2
                        election                    N14EL24
                      Pre-effective amendments      N14EL24/A
                      Initial statement with auto-
                        matic effectiveness         N-14AE
                      Pre-effective amendments      N-14AE/A
                      Initial statement with auto-
                        matic effectiveness with
                        24f-2 election              N14AE24
```

- A-24 -

```
                Pre-effective amendments        N14AE24/A

Definitive materials            497
                Certification of no change
                in definitive materials         497J REGISTRATION OF SECURITIES BY CERTAIN INVESTMENT COMPANIES
PURSUANT TO RULES 24f-1, 24f-2, and 24f-3

Rule 24f-1    Notification of election          24F-1

Rule 24f-2    Declaration of election           24F-2EL
              Amendment to declaration of
                election                        24F-2EL/A
                Rule 24f-2 notice               24F-2NT
              Amendment to Rule 24f-2
                notice                          24F-2NT/A
              Termination of declaration of
                election                        24F-2TM
                Amendment to the termination
                of declaration of election      24F-2TM/A Rule 24f-3    Rule 24f-3 notice for secondary
              securities registration (unit
              investment trusts)                24F-3NT
              Amendments to Rule 24f-3 notice
              for Secondary securities
              registration                      24F-3NT/A

INVESTMENT COMPANY ACT REGISTRATION STATEMENTS

Form N-8A     Notification of registration
              under section 8(a)
                Initial filing                  N-8A
                Amendments                      N-8A/A Form N-8B-2   Registration statement for unit
              investment trusts
                Initial filing                  N-8B-2
                Amendments                      N-8B-2/A Form N-8B-3   Registration statement for
              periodic payment Plans            N-8B-3
                Amendments                      N-8B-3/A Form N-8B-4   Registration statement for
              face-amount certificate
```

- A-25 -

|   |   |   |
|---|---|---|
|  | companies | N-8B-4 |
|  | Amendments | N-8B-4/A |

FORMS FOR BUSINESS DEVELOPMENT COMPANIES

| Form 6-F | Notice of intent by business development companies to elect to be subject to sections 55 through 65 of the 1940 act | |
|---|---|---|
|  | Initial filing | N-6F |
|  | Amendments | N-6F/A |
| Form N-54A | Notification of election by business development companies | |
|  | Initial filing | N-54A |
|  | Amendments | N-54A/A |
| Form N-54C | Notification of withdrawal by business development companies | N-54C |
|  | Amendments | N-54C/A |

MISCELLANEOUS INVESTMENT COMPANY FORMS

| Form N-18F-1 | Notification of election pursuant to Rule 18f-1 | |
|---|---|---|
|  | Initial filing | N-18F1 |
|  | Amendments | N-18F1/A |
| Form 23C-1 | Reports by closed-end investment companies of purchase of their own securities | |
|  | Initial filing | N-23C-1 |
|  | Amendments | N-23C-1/A |
| Form N-27D-1 | Accounting for segregated trust accounts | |
|  | Initial filing | N-27D-1 |
|  | Amendments | N-27D-1/A |
| Form N-6C9 | Exemptions for foreign banks under Rule 6(c)9(c) | |
|  | Initial filing | N-6C9 |
|  | Amendments | N-6C9/A |
| Form 2-E | Reports of sales of securities | |

- A-26 -

```
                           pursuant to
                             Regulation E             2-E
                             Amendments              2-E/A

PERIODIC REPORTS FOR REGISTERED INVESTMENT COMPANIES

Form N-SAR      Semi-annual report for manage-
                          ment companies              NSAR-A
                          Amendments to semi-annual
                            report                    NSAR-A/A
                          Transitional semi-annual
                            report                    NSAR-AT
                          Amendments to transitional
                            semi-annual report        NSAR-AT/A
                          Annual report for management
                            companies                 NSAR-B
                            Amendments to annual report  NSAR-B/A
                            Transitional annual report   NSAR-BT
                            Amendments to transitional
                              annual report           NSAR-BT/A
                          Annual report for unit invest-
                            ment trusts               NSAR-U
                            Amendments to annual report
                              for unit investment trusts  NSAR-U/A
                          Request for extension of time
                            for filing form N-SAR     NT-NSAR
                            Amendments to request for
                              extension of time for
                              filing form N-SAR       NT-NSAR/A Form N-30D      Annual and semi-annual
                          reports mailed to
                          shareholders                N-30D
                          Amendments                  N-30D/A Form N-30B-2    Periodic and interim reports  N-30B-2
                          mailed to shareholders
```

What is claimed is:

1. A software system for producing the inferences in a specialized field, the software system fixed in a machine-readable medium, and the software system comprising:

synthesis software tools when executed by a processor receive documents including freely formatted text documents and which produce a formatted database of information from the freely formatted text documents, the synthesis software tools relating instances to concepts, an instance which can be associated with plural concepts being related to a single concept with reference to a context in which the instance appears; and analysis software tools which when executed by a processor receive the formatted database, fill portions of a template of predefined relationships between different concepts, the predefined relationships being relevant to inferences in the specialized field, cluster the filled portions of the template of predefined relationships according to a similarity index computed between the filled portions of the template of predefined relationships when the similarity index exceeds a threshold value to form a grouped database, draw inferences from the grouped database and produce an analysis output containing the inferences, wherein the analysis software tools comprise a diagonalization tool which forms the grouped database in which each cluster of topics having the similarity index exceeding the threshold value is a group.

2. A software system as defined in claim 1, the synthesis tools further comprising:

a concept dictionary relating a concept word root, a context word root and an instance word root;

a parser which receives the documents and which produces a plurality of words contained in the documents;

a rooter which receives the words parsed by the parser and which produces corresponding word roots for the words received; and a contexter which receives the concept dictionary and the word roots and which identifies a concept corresponding to each word root on the basis of the word roots received.

3. A software system as defined in claim 2, wherein the word roots include a word root defining context, and one or more word roots associated with the context, the contexter further comprising:

a context recognizer which identifies in the concept dictionary all concepts having word roots associated with the context; and an instance recognizer which identifies in the concept dictionary all concepts previously identified by the context recognizer which also include an instance word root matching the word root.

4. A software system as defined in claim 1, the analysis tools further comprising:

an inferencer which receives the groups from the grouped database and which produces an inferenced database in which inferences are drawn on the basis of information present in and absent from the groups.

5. A software system as defined in claim 1, the analysis tools further comprising;

a catalog defining each database entry as one of either required or optional.

6. The software system of claim 1, wherein the specialized field is corporate financial information disclosure.

7. A software system as defined in claim 6, the synthesis tools further comprising:

a concept dictionary relating a concept word root, a context word root and an instance word root;

a parser which receives the documents and which produces a plurality of words contained in the documents;

a rooter which receives the words parsed by the parser and which produces corresponding word roots for the words received; and a contexter which receives the concept dictionary and the word roots and which identifies a concept corresponding to each word root on the basis of the word roots received.

8. A software system as defined in claim 6, wherein the word roots include a word root defining context, and one or more word roots associated with the context, the contexter further comprising:

a context recognizer which identifies in the concept dictionary all concepts having word roots associated with the context; and an instance recognizer which identifies in the concept dictionary all concepts previously identified by the context recognizer which also include an instance word root matching the word root.

9. A software system as defined in claim 6, the analysis tools further comprising:

a catalog defining each database entry as one of either required or optional.

10. A software system as defined in claim 6, the analysis tools further comprising:

an inferencer which receives the groups from the grouped database and which produces an inferenced database in which inferences are drawn on the basis of information present in and absent from the groups.

* * * * *

UNITED STATES PATENT AND TRADEMARK OFFICE
CERTIFICATE OF CORRECTION

PATENT NO.     : 6,374,270 B1
DATED          : April 16, 2002
INVENTOR(S)    : Oded Maimon and David Israel-Rosen It is certified that error appears in the above-identified patent and that said Letters Patent is hereby corrected as shown below:

<u>Column 67,</u>
Line 1, please delete "the".
Line 5, after the word "tools" please insert -- which --.

<u>Column 68,</u>
Line 11, please delete ";" and replace with -- : --.

Signed and Sealed this

Second Day of July, 2002

Attest:

Attesting Officer

JAMES E. ROGAN
Director of the United States Patent and Trademark Office